United States Patent [19]

Panek et al.

[11] 4,313,913

[45] Feb. 2, 1982

[54] PRODUCTION OF HYDROLYZABLE TITANYL SULPHATE SOLUTION

[75] Inventors: Peter Panek; Walter Gutsche; Peter Woditsch, all of Krefeld, Fed. Rep. of Germany

[73] Assignee: Bayer Aktiengesellschaft, Leverkusen, Fed. Rep. of Germany

[21] Appl. No.: 213,539

[22] Filed: Dec. 5, 1980

[30] Foreign Application Priority Data

Dec. 21, 1979 [DE] Fed. Rep. of Germany ....... 2951799

[51] Int. Cl.³ .............................................. C01G 23/00
[52] U.S. Cl. ........................................ 423/82; 423/86
[58] Field of Search ....................................... 423/82, 86

[56] References Cited

U.S. PATENT DOCUMENTS 2,631,924  3/1953  McKinney ............................ 423/86

FOREIGN PATENT DOCUMENTS 1051261  2/1959  Fed. Rep. of Germany ........ 423/82
1052378  3/1959  Fed. Rep. of Germany ........ 423/82
741757  12/1955  United Kingdom ................. 423/82

OTHER PUBLICATIONS

Barksdale, J., *Titanium,* 2nd Ed., Ronald Press, N.Y., 1966, pp. 231–237.

*Primary Examiner*—Brian E. Hearn
*Attorney, Agent, or Firm*—Sprung, Felfe, Horn, Lynch & Kramer

[57] ABSTRACT

A process for the production of a hydrolyzable titanyl sulphate solution comprising contacting sulphuric acid of about 86% concentration with a mixture of slag and ilmenite, the ratio of $H_2SO_4$ to $TiO_2$ in the mixture ranging from about 1.7:1 to 2.2:1 and the mol ratio of Ti(III) to Fe(III) in the mixture ranging from about 25:1 to 1.4:1, the slag having a $TiO_2$ content of >80% and a Ti(III) content of about 22 to 40% calculated as $TiO_2$, and the ilmenite having a Fe(III) to Fe(II) ratio from about 1:1 to 10:1, and adding water if necessary to bring the concentration of sulphuric acid to from about 86 to 96%.

9 Claims, No Drawings

PRODUCTION OF HYDROLYZABLE TITANYL SULPHATE SOLUTION

The present invention relates to a process for the production of a hydrolyzable titanyl sulphate solution which is suitable for processing into titanium dioxide pigments, by the simultaneous decomposition of slag, rich in $TiO_2$ and $Ti(III)$, and ilmenite using sulphuric acid having a content of $H_2SO_4$ of greater than 86%, and by dissolving the solidified reaction mass in an aqueous solvent, the sulphuric acid preferably being added as oleum and pre-concentrated recycled dilute acid.

The simultaneous decomposition of titaniferous slags and the widely varied ilmenites using concentrated sulphuric acid has been frequently described.

Thus, in British Pat. No. 741,757, the simultaneous decomposition of a mixture of from 10 to 80 parts, by weight, of a ferrotitaniferous ore and from 90 to 20 parts, by weight, of a reduced titaniferous slag at elevated temperatures using concentrated sulphuric acid is claimed. For example, reactions of sulphuric acid with a primary ilmenite which has alone a solubilization yield of 92% $TiO_2$ and with slags which have alone solubilization yields of only from 80 to 66.5% $TiO_2$ are specified.

U.S. Pat. No. 2,631,924 describes the simultaneous decomposition of a finely ground mixture of from 35 to 65 parts, by weight, of an ilmenite having a $TiO_2$ content of as much as 60% and a $Fe(III)$ content of >50% of the total iron content and from 65 to 35 parts, by weight, of a slag having a $TiO_2$ content of from 60 to 80%, whereby from 10 to 20% of the $TiO_2$ content is present in reduced form (as $Ti_2O_3$), in concentrated sulphuric acid.

Decompositions according to both processes lead, according to personal research, to greatly fluctuating yields of soluble titanium sulphate, particularly in the case of simultaneous decomposition using increasing proportions by weight of ilmenite. Therefore, it is understandable why the process according to German Pat. No. 1,052,378 for the preparation of hydrolyzable titanyl sulphate solutions by reacting finely divided mixtures of ilmenite and molten titaniferous slag with concentrated sulphuric acid and dissolving the solidified reaction mass in an aqueous solvent, is directed towards such ilmenite/slag mixtures which only contain from 10 to 20% of ilmenite.

However, it is particularly desirable for economic reasons to react large ilmenite quantities together with titaniferous slags without simultaneously having to accept a reduced yield of soluble titanyl sulphate. Surprisingly, it has been found in experiments with different slags and ilmenites that the solubilization yield of such ilmenite/slag mixtures depends to a considerable extent on the $Ti(III)$ content of the total mixtures. It is apparent that particularly large ilmenite quantities may then be reacted with titaniferous slags with a good solubilization yield, when, according to the present invention, slags which have a $TiO_2$ content of >80% and a $Ti(III)$ content of about 22 to 40%, preferably about 25 to 35%, calculated as $TiO_2$ and based on the slag, and an ilmenite which has a $Fe(III)$ to $Fe(II)$ ratio of about 1:1 to 10:1, are reacted with sulphuric acid in such a ratio that the mol ratio of $Ti(III)$ to $Fe(III)$ in the mixture is about 25:1 to 1.4:1, preferably about 3.6:1 to 1.5:1.

The decomposition of titaniferous crude substances with mixtures of oleum and recycled pre-concentrated sulphuric acid has also been frequently described.

The known processes usually use the heat of dilution, generated when a diluted and a concentrated sulphuric acid are brought together, to start the reaction of a titaniferous crude substance with this acid mixture. The concentration of the recycled pre-concentrated dilute acids used in this case is thus chosen to be relatively low so that the heat of dilution generated when mixing with the concentrated acid is sufficient to allow the reaction of the ore with the acid mixture to follow within a certain period of time without supplying more energy.

It is also known that during the reaction of slag with oleum and recycled pre-concentrated dilute acid, an undesirable large concentration of heavy metal traces, such as chromium and vanadium, easily results. In subsequent hydrolysis, these traces remain partially in the resulting titanium dioxide hydrolyzate and, after calcination, lead to undesirable discoloration of the pigments.

Surprisingly it has now been found that this concentration of heavy metal traces in the inventive simultaneous reaction of ilmenite and slag using sulphuric acid or oleum and pre-concentrated dilute acid, recycled from this process, in the hydrolyzable titanyl sulphate solution, obtained from the reaction material after dissolving in an aqueous solvent and after clarification then ceases or is suppressed to such an extent that no further detrimental effects may be estalished in the pigments obtained therefrom when pre-concentrated dilute acid, recycled from this process is used which was pre-concentrated to a $H_2SO_4$ concentration of about 60 to 75%, preferaly about 63 to 71%. In this case, the heat of dilution generated when mixing this dilute acid with oleum suffices to allow the reaction of the present ilmenite/slag mixture with the acid mixture to take place without supplying more energy.

The present invention relates to a process for the production of a hydrolyzable titanyl sulphate solution by the simultaneous reaction of ilmenite and slag using sulphuric acid and by dissolving the solidified reaction mass in an aqueous solvent, wherein a fine-particled slag which has a $TiO_2$ content of >80% and a $Ti(III)$ content of about 22 to 40%, preferably about 25 to 35%, calculated as $TiO_2$ and based on the slag, and a fine-particled ilmenite which has a $Fe(III)$ to $Fe(II)$ ratio of about 1:1 to 10:1, are mixed such that the mol ratio of $Ti(III)$ to $Fe(III)$ in the mixture is from about 25:1 to 1.4:1, preferably from about 3.6:1 to 1.5:1, sulphuric acid of a concentration of more than 86% is mixed with the mixture in amount sufficient to bring the ratio of $H_2SO_4$ to $TiO_2$ to from about 1.7:1 to 2.2:1, and the reaction is started by adding sufficient water, dilute sulphuric acid or steam such that the $H_2SO_4$ concentration is subsequently from about 86 to 96%.

Another embodiment of the present process comprises initially mixing the slag with oleum or the pre-concentrated dilute acid and then mixing with a mixture of the ilmenite in pre-concentrated dilute acid or oleum. A preferred embodiment of the present process comprises grinding the slag and the ilmenite together and mixing with oleum or pre-concentrated dilute acid and the reaction is started using pre-concentrated dilute acid or oleum. Another preferred embodiment of the process comprises using oleum having a $SO_3$ content of up to about 30% and recycled, pre-concentrated dilute acid having a H₂SO₄ concentration of from about 60 to 75%, preferably from about 63 to 71%.

The process according to the present invention not only operates in a particularly economical manner, but also provides significant processing advantages with respect to the preparation of a hydrolyzable titanyl sulphate solution of respectively only one of the crude substances and also with respect to the separate decomposition of both crude substances and the later combination of both solutions.

During the single sulphuric acid decomposition of slag, the Ti(III) content of the slag acts as a reducing agent on the sulphuric acid. Thereby, some of the sulphuric acid is lost as sulphur dioxide or as hydrogen sulphide and has to be removed from the exhaust air. The resulting reaction solution may also contain considerable quantities of Ti(III). Thus, it is hardly suitable for the subsequent hydrolysis as the Ti(III) present in the solution must first be oxidized to be able to be hydrolyzed in high yield. On the other hand, the single decomposition of ilmenites containing $Fe_2O_3$ using sulphuric acid leads to solutions which must first be mixed with a large quantity of iron scrap before hydrolysis in order to reduce the Fe(III) present to Fe(II) ions. In this process, additional sulphuric acid is used and the total iron content of the solutions increases to such an extent that they cannot be used directly for hydrolysis. Instead, they must first be cooled to separate the iron in the form of $FeSO_4.7H_2O$. In contrast thereto, according to the present process, the Ti(III) of the slag preferably reacts with the Fe(III) of the ilmenite so that an additional Fe(III) reduction, an additional Ti(III) oxidation and an iron separation do not have to be carried out and an additional sulphuric acid consumption is not required. The process according to the present invention also provides the clear advantage that larger quantities of ilmenite may be processed in contrast to the separate decomposition of a slag containing $TiO_2$ and Ti(III) and an ilmenite and later combining the individual solutions in such a ratio that all the iron of the ilmenite solution is reduced to Fe(II) by the Ti(III) still present in the slag solution.

Furthermore, the process according to the present invention minimizes pollution as it allows significant recycling of the pre-concentrated dilute acid obtained from the process in one simple operation. This is particularly significant with respect to the co-processing of large quantities of ilmenite.

The present process allows in one particularly economic operation which is easy to carry out technically, the processing of slag containing $TiO_2$ and Ti(III) together with as much as approximately 45% of ilmenite, recycling considerable proportions of pre-concentrated dilute acid without reduction in the solubilization yield and without resulting in a disadvantageous accumulation in the reaction solution of the heavy metal traces, such as chromium or vanadium, mainly originating from the slag used. Therefore, after dissolving the reaction mass in an aqueous solvent and after a clarification step, a hydrolyzable titanyl sulphate solution is obtained which is suitable for directly processing into titanium dioxide pigments, without an additional reduction step for reducing the content of Fe(III) present in the ilmenite and without an additional oxidation step for reducing the Ti(III) content of the slag. Losses of sulphuric acid by the reaction of the Ti(III) with the sulphuric acid and also by the reaction with iron scrap to produce the content of Fe(III) contained in the ilmenite are also avoided. Furthermore, the reduction potential of the slag is used extensively in a quantitative manner for a reaction with the Fe(III) content of the ilmenite so that titanyl sulphate solutions are obtained the total iron content of which is so low that a separation of, e.g., $FeSO_4.7H_2O$ is unnecessary.

The process according to the present invention is exemplified in the following examples. Unless otherwise indicated, the percentages represent percent by weight.

EXAMPLE 1

239.4 g of 96% sulphuric acid were introduced into a 500 ml glass vessel which was equipped with a thermometer and stirrer and placed in an air bath which could be adjusted to the reaction temperature in the reaction vessel to compensate for the heat lost by radiation. 95.1 g of slag ground to a particle size of 68.5% <40 μm, having a $TiO_2$ content of 85,1%, a Ti(III) content of 30.2% (calculated as $TiO_2$ and based on the slag), and a Fe content of 9.5%, and also 31,7 g of ilmenite, ground to a particle size of 92.9%, <40 μm, having a $TiO_2$ content of 60.2%, a Fe content of 25.0% and a Fe(III) to Fe(II) ratio of 2.29:1, were introduced and mixed with 16.3 g of water at 40° C. with intensive stirring to start the decomposition reaction. Thus, 100 g of $TiO_2$ were present in the mixture, the mol ratio of Ti(III) to Fe(III) was 3.6:1, the ratio of $H_2SO_4$ to $TiO_2$ was 2:1 and the $H_2SO_4$ end concentration was 89.9%. 75 parts of slag to 25 parts of ilmenite were used. When all of the water had been added, the maximum reaction temperature of the exothermic reaction of 203° C. was reached in 33 minutes. The solidified reaction mass was then aged for 4 hours, during which period the temperature fell to 180° C. and the reaction mass was then dissolved by adding 350 ml of water in 4 hours at 70° C. 97.6% of the $TiO_2$ present was in solution and 6.9% of the dissolved $TiO_2$ was present as Ti(III).

EXAMPLE 2

Into the apparatus described in Example 1 were introduced 249.2 g of 96% sulphuric acid; 74.4 g of the slag used in Example 1 ground to a particle size of 68.5% <40 μm (85.1% of $TiO_2$; 30.2% of Ti(III), calculated as $TiO_2$ and based on the slag, 9.5% of Fe) and also 60.9 g of the ilmenite used in Example 1 and ground to a particle size of 92.9% <40 μm (60.2% of $TiO_2$; 25% Fe; Fe(III): Fe(II)=2.29:1) were introduced and mixed with 16.9 g of water at 40° C. with intensive stirring to start the reaction. Thus, 100 g of $TiO_2$ were present in the mixture, the mol ratio of Ti(III) to Fe(III) was 1.48:1, the ratio of $H_2SO_4$ to $TiO_2$ was 2:1 and the $H_2SO_4$ end concentration was 89.9%. 55 parts of slag to 45 parts of ilmenite were used. When all the water had been added, the maximum reaction temperature of the exothermic reaction of 201° C. was reached in 27 minutes. The solidified reaction mass was then aged for 4 hours as in Example 1, during which time the temperature fell to 178° C. and the reaction mass was then dissolved by adding 350 ml of water in 4 hours at 70° C. 98.0% of the $TiO_2$ used was in solution. No Ti(III) could be detected in the solution, but a small Fe(III) content could be detected corresponding to a ratio of Fe(III) to Fe(II) of 0.05:1.

COMPARATIVE EXAMPLE VA 254.5 g of 96% sulphuric acid were introduced into the apparatus described in Example 1, 63.0 g of the slag prepared and described in the previous Examples and 77.0 g of the ilmenite, prepared and described in the previous example were introduced and mixed with 17.3 g of water with intensive stirring at 40° C. to start the reaction. Thus, 100 g of TiO$_2$ were present in the mixture, the mol ratio of Ti(III) to Fe(III) was 0.99:1, the ratio of H$_2$SO$_4$ to TiO$_2$ was 2:1 and the H$_2$SO$_4$ end concentration was 89.9%. Therefore, in this Comparative Example, which lies outside the scope of the present process, 45 parts of slag to 55 parts of ilmenite were used. When all the water had been added, the maximum reaction temperature of the exothermic reaction of 199° C. was reached in 26 minutes. The solidified reaction mass was then cured and dissolved as in the previous Examples. 71.8% of the TiO$_2$ used was in the solution.

EXAMPLE 3

159.6 g of oleum having an SO$_3$ content of 27.2% were introduced into the apparatus described in Example 1, 79.9 g of the slag, prepared and described as in the previous examples and 53.3 g of the ilmenite, prepared and described in the previous examples were introduced and 103.3 g of a recycled dilute acid, pre-concentrated to a H$_2$SO$_4$ content of 65.1% were added with intensive stirring at 40° C. to start the reaction. Thus, 100 g of TiO$_2$ were present in the mixture, the mol ratio of Ti-(III) to Fe(III) was 1.81:1, the ratio of H$_2$SO$_4$ to TiO$_2$ was 2:1 and the H$_2$SO$_4$ end concentration was 90.9%. 60 parts of slag to 40 parts of ilmenite were used. When all the recycled, pre-concentrated dilute acid had been added, the maximum reaction temperature of 194° C. was reached in 27 minutes in an exothermic reaction. The solidified reaction mass was then aged and dissolved as in the pevious examples. 97.8% of the TiO$_2$ used was in solution and 4% of the dissolved TiO$_2$ was present as Ti(III).

COMPARATIVE EXAMPLE VB

In a comparative example, the reaction behavior of the slag described and used in Example 1 was examined. For this purpose, 3894 g of 96% sulphuric acid and 2000 g of the slag, prepared and described in the previous examples were mixed together in a 10 liter conical-base glass vessel, equipped with a thermometer and a dipping tube to introduce air, and, to compensate for heat radiation, located in an air bath to readjust the internal temperature of the reaction vessel and were mixed with 265 ml of water at 70° C. to start the reaction, while passing through air. 1702 g of TiO$_2$ were present in the mixture, the ratio H$_2$SO$_4$ to TiO$_2$ was 2:1 and the H$_2$SO$_4$ end concentration was 89.9%. After all the water had been added, the maximum reaction temperature of 204° C. was reached in 32 minutes in an exothermic reaction. The solidified reaction mass was then aged as in the previous examples and dissolved by adding 6 l of water in 5 hours at 70° C. 96.7% of the TiO$_2$ used were in the solution and 14.5% of the dissolved TiO$_2$ was present as Ti(III).

COMPARATIVE EXAMPLE VC

In this further comparative example, the reaction behavior of the ilmenite which was descirbed and used in Example 1 was investigated. For this purpose, 3424 g of 96% sulphuric acid and 2000 g of the ilmenite, prepared and described in Examples 1 and 2 were mixed together in the apparatus described in Example 5 and were mixed with 186 ml of water to start the reaction at 40° C., while passing air through. 1204 g of TiO$_2$ were present in the mixture, the ratio of H$_2$SO$_4$ to TiO$_2$ was 2:1 and the H$_2$SO$_4$ end concentration was 91.0%.

After adding all the water, the maximum reaction temperature of 205° C. was reached in 33 minutes in an exothermic reaction. The solid reaction mass was subjected to an aging process for 3 hours, the temperature falling to 180° C. 6 l of water were then added and the reaction mass was dissolved at 70° C. for 5 hours. 92.5% of the TiO$_2$ used was in solution. Of the iron present, 97.6% was in solution having a Fe(III) to Fe(III) ratio of 2.77:1.

It will be appreciated that the instant specification and examples are set forth by way of illustration and not limitation, and that various modifications and changes may be made without departing from the spirit and scope of the present invention.

What is claimed is:

1. A process for the production of a hydrolyzable titanyl sulphate solution comprising contacting sulphuric acid of about 86% concentration with a mixture of slag and ilmenite, the ratio of H$_2$SO$_4$ to TiO$_2$ in the mixture ranging from about 1.7:1 to 2.2:1 and the mol ratio of Ti(III) to Fe(III) in the mixture ranging from about 25:1 to 1.4:1, the slag having a TiO$_2$ content of 80% and a Ti(III) content of about 22 to 40% calculated as TiO$_2$ and the ilmenite having a Fe(III) to Fe(II) ratio from about 1:1 to 10:1, and adding water if necessary to bring the concentration of sulphuric acid to from about 86 to 96%.

2. A process according to claim 1, wherein the Ti(III) content of the slag is from about 25 to 35%, and the mol ratio of Ti(III) to Fe(III) is from about 3.6:1 to 1.5:1.

3. A process according to claim 1, wherein the slag is initially mixed with oleum and is then mixed with a mixture of the ilmenite in pre-concentrated recycled dilute acid.

4. A process according to claim 1, wherein the slag is initially mixed with pre-concentrated recycled dilute acid and is then mixed with a mixture of the ilmenite in oleum.

5. A process according to claim 1, wherein the slag and the ilmenite are ground together and mixed with oleum, the reaction being started by adding pre-concentrated recycled dilute acid to bring the concentration to from about 86 to 96%.

6. A process according to claim 1, wherein the slag and the ilmenite are ground together and mixed with pre-concentrated recycled dilute acid, the reaction being started by adding oleum to bring the concentration to from about 86 to 96%.

7. A process according to claim 3, 4, 5 or 6, wherein the Ti(III) content of the slag is from about 25 to 35%, and the mol ratio of Ti(III) to Fe(III) is from about 3.6:1 to 1.5:1.

8. A process according to claim 3, 4, 5, or 6, wherein the oleum has a SO$_3$-content of up to about 30%.

9. A process according to claim 3, 4, 5 or 6, wherein the pre-concentrated recycled dilute acid has a H$_2$SO$_4$-content of about 60 to 75%, preferably of about 63 to 71%.

* * * * *